United States Patent [19]

Tsuruga et al.

[11] Patent Number: 5,356,981
[45] Date of Patent: Oct. 18, 1994

[54] STABILIZER FOR CHLORINATED RESIN AND STABILIZED CHLORINATED RESIN COMPOSITION

[75] Inventors: Koji Tsuruga; Kiyotatsu Iwanami, both of Saitama, Japan

[73] Assignee: Asahi Denka Kogyo Kabushiki Kaisha, Tokyo, Japan

[21] Appl. No.: 6,132

[22] Filed: Jan. 19, 1993

Related U.S. Application Data

[63] Continuation of Ser. No. 588,259, Sep. 26, 1990, abandoned.

[30] Foreign Application Priority Data

Sep. 26, 1989 [JP] Japan ................... 1-249816

[51] Int. Cl.$^5$ .................. C08K 11/00; C08K 3/10
[52] U.S. Cl. ................... 524/413; 423/423; 423/430; 423/420.2
[58] Field of Search ........... 524/169, 413, 437, 436; 423/419, 430, 423; 252/397

[56] References Cited

U.S. PATENT DOCUMENTS

| | | | |
|---|---|---|---|
| 4,284,762 | 8/1981 | Miyata et al. | 524/451 |
| 4,299,759 | 11/1981 | Miyata et al. | 524/451 |
| 4,371,656 | 2/1983 | Kashiwara et al. | 524/399 |
| 4,379,882 | 4/1983 | Miyata | 524/437 |
| 4,675,356 | 6/1987 | Miyata | 524/436 |
| 5,006,579 | 4/1991 | Akamine et al. | 524/415 |

FOREIGN PATENT DOCUMENTS

| | | |
|---|---|---|
| 54-034356 | 3/1979 | Japan . |
| 59-102942 | 6/1984 | Japan . |
| 59-102943 | 6/1984 | Japan . |

OTHER PUBLICATIONS

WO-89/03414 published Apr. 1989.

*Primary Examiner*—Veronica P. Hoke
*Attorney, Agent, or Firm*—Young & Thompson

[57] ABSTRACT

A stabilizer for a rigid chlorinated resin comprising a hydrotalcite compound and an inorganic copper compound and a stabilized rigid chlorinated resin composition obtained by adding said stabilizer to a chlorinated resin.

4 Claims, No Drawings

STABILIZER FOR CHLORINATED RESIN AND STABILIZED CHLORINATED RESIN COMPOSITION

This application is a continuation of application Ser. No. 07/588,259, filed Sept. 26, 1990, now abandoned.

BACKGROUND OF THE INVENTION

1. Field of the Invention

This invention relates to a stabilizer for a rigid chlorinated resin comprising a hydrotalcite compound and an inorganic copper compound and a rigid chlorinated resin composition whose weatherability, chalking resistance and physical properties are improved by adding said stabilizer to a rigid chlorinated resin.

2. Description of the Prior Art

In general, a chlorinated resin, which is less stable to heat and light, would frequently undergo thermal decomposition mainly caused by dehydrochlorination in a thermal molding step. As a result, the mechanical properties and the color tone of the obtained processed product are deteriorated, which brings about a serious disadvantage.

In order to avoid these problems, therefore, attempts have been made to add one or more stabilizers to chlorinated resins to thereby stabilize the same.

Among these stabilizers, lead stabilizers, which are relatively effective in imparting heat ability, are widely employed. However a chlorinated resin comprising lead stabilizers suffers from some disadvantages such that it suffers from chloration during processing and that it has a poor weatherability and thus shows chalking (i.e., whitening), in particular, when used outdoor. Thus it has been required to overcome these disadvantages.

Recently, furthermore, a higher heat stability under severe temperature conditions has been required.

In order to satisfy these requirements, Japanese Patent Laid-Open No. 150/1982 has proposed to use a lead stabilizer together with an organotin compound. However this combined use is scarcely effective on the prevention of chalking and, further, gives only a limited heat stability. Furthermore, it has been suggested to use a lead stabilizer together with a 2,6-dimethyl-1,4-dihydropyridine compound (Japanese Patent Laid-Open No. 16313/1981) or a compound having a 2,2,6,6-tetramethylpiperidine group (Japanese Patent Laid-Open No. 196351/1984). However none of these methods can give a satisfactory effect. Thus it has been required to establish an improved method.

On the other hand, a composition simultaneously containing a metal stearate would suffer from chalking. In the case of a molded product of a lead-free composition containing a large amount of various metal soaps as a stabilizer and a lubricant. In particular, serious chalking is observed. In order to prevent the chalking, Japanese Patent Laid-Open No. 57844/1981 has proposed to use a polyol partial ester. However the effect thus achieved is yet insufficient.

Furthermore, Japanese Patent Laid-Open No. 02942/1984 has proposed to use an inorganic copper compound such as cuprous chloride, cuptic chloride, copper sulfate, basic copper carbonate or copper carbonate. Although this method is effective in improving the chalking of a chlorinated resin, the heat stability, thermal coloring properties and weatherability of the chlorinated resin are deteriorated thereby.

Furthermore, an organotin compound would relatively suppress the occurrence of chalking. However, an organotin compound, in particular, an organotin mercaptide compound would deteriorate the weatherability of a chlorinated resin, which restricts the application range thereof. Thus it has been required to overcome this problem.

SUMMARY OF THE INVENTION

The present inventors have conducted extensive studies in order to solve the above-mentioned problems. As a result, they have found out that a rigid chlorinated resin composition having improved weatherability, chalking resistance and physical properties can be obtained by adding a stabilizer comprising a hydrotalcite compound and an inorganic copper compound to a chlorinated resin.

Accordingly, the present invention, which has been completed based on the above finding, provides a stabilizer for a rigid chlorinated resin which comprises a hydrotalcite compound and an inorganic copper compound.

The present invention further provides a rigid chlorinated resin composition which has been stabilized by adding the above-mentioned stabilizer of the present invention.

The chlorinated resin composition of the present invention comprising the stabilizer of the present invention shows an improved weatherability, improved chalking resistance and improved physical properties.

DETAILED DESCRIPTION OF THE INVENTION

Examples of the chlorinated resin to be used in the present invention include chlorinated resins such as polyvinyl chloride, chlorinated polyvinyl chloride, polyvinylidene chloride, chlorinated polyethylene, vinyl chloride/vinyl acetate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride terpolymer, vinyl chloride/styrene/acrylonitrile copolymer, vinyl chloride/butadiene copolymer, vinyl chloride/isoprene copolymer, vinyl chloride/chlorinated propylene copolymer, vinyl chloride/vinylidene chloride/vinyl acetate terpolymer, vinyl chloride/maleate copolymer, vinyl chloride/methacrylate copolymer, vinyl chloride/acrylonitrile copolymer and vinyl chloride/various vinyl ether copolymers and blends, block copolymers and graft copolymers of these chlorinated resins with each other or with other chlorine-free synthetic resins.

As the hydrotalcite compound to be used in the present invention, a hydrous double salt compound comprising magnesium and aluminum represented by the following general formula (1):

$$Mg_{1-x}Al_x(OH)_2A_{x/2} \cdot mH_2O \qquad (1)$$ 

wherein x is a real number falling within a range of $0 < X \leq 0.5$; A represents a $CO_3$ or $SO_4$ group; and m is a real number, may be cited.

The above-mentioned hydrotalcite compound may be either a natural substance or a synthetic one. It may be synthesized by known methods described in, for example, Japanese Patent Publication No. 2280/1971, No. 30039/1975 and No. 29129/1976. In the present invention, a hydrotalcite compound may be selected without being restricted by crystalline structure or crystal particle size.

Furthermore, a hydrotalcite compound whose surface is coated with a higher fatty acid (e.g., stearic acid), a higher fatty acid metal salt (e.g., an alkali metal oleate), an organic sulfonic acid alkali metal salt (e.g., an alkali metal dodecylbenzenesulfonate), a higher fatty acid amide, a higher fatty acid ester or wax may be used therefor.

Furthermore, a hydrotalcite modified with, for example, zinc may be employed.

Examples of the inorganic copper compound to be used in the present invention include copper oxide, copper hydroxide, copper halides and copper salts of inorganic acids such as copper carbonate and copper sulfate. Among these compounds, watersoluble inorganic copper compounds are preferable and copper halides are particularly preferable.

The stabilizer for a rigid chlorinated resin of the present invention may preferably comprise the above-mentioned hydrotalcite compound and the above-mentioned inorganic copper compound at a ratio of 0.01 to 2 parts by weight of the inorganic copper compound per part by weight of the hydrotalcite compound.

The rigid chlorinated resin composition of the present invention may preferably comprise the above-mentioned stabilizer of the present invention at a ratio of from 0.02 to 5 parts by weight per 100 parts by weight of the chlorinated resin.

The rigid chlorinated resin composition of the present invention may comprise the above-mentioned hydrotalcite compound and the above-mentioned inorganic copper compound at ratios of 0.01 to 3 parts by weight, in particular, 0.02 to 2 parts by weight, of the hydrotalcite compound and 0.01 to 5 parts by weight, in particular, 0.05 to 3 parts by weight, of the inorganic copper compound per 100 parts by weight of the chlorinated resin.

The above-mentioned inorganic copper compound and hydrotalcite compound may be separately added to the chlorinated resin. Alternately, these compounds may be added simultaneously to the chlorinated resin in the form of, for example, a mixture obtained by adding the hydrotalcite compound to an aqueous solution of the inorganic copper compound to thereby adsorb the inorganic copper compound by the hydrotalcite compound or a reaction mixture obtained by reacting these compounds, as the stabilizer of the present invention. Now Synthetic Examples for producing the stabilizer of the present invention will be given.

SYNTHETIC EXAMPLE 1

4.8g of cupric chloride was dissolved in 100 ml of water and 10 g of Alcamizer I (synthetic hydrotalcite compound mfd. by Kyowa Chemical Industries, Co., Ltd.) was added thereto. The mixture was heated to 60° to 70° C. When the blue green color of the cupric chloride disappeared, the mixture was cooled to room temperature, filtered and dried. Thus a stabilizer I was synthesized.

SYNTHETIC EXAMPLES 2 TO 4

The procedure of Synthetic Example 1 was repeated except that the Alcamizer I was replaced by the following hydrotalcite compounds to thereby give stabilizers II to IV.

| | Hydrotalcite* |
|---|---|
| Stabilizer II: | Alcamizer II |
| Stabilizer III: | Alcamizer IV |
| IV: | DHT-4A |

*: Each a synthetic hydrotalcite compound manufactured by Kyowa Chemical Industries, Co., Ltd.)

In the present invention, a commonly used metallic stabilizer may be used. Examples thereof include lead stabilizers, calcium stabilizers, zinc stabilizers, magnesium stabilizers, barium stabilizers and organotin stabilizers.

Examples of the lead stabilizers include basic lead carbonate, basic lead silicate, basic lead sulfate, dibasic lead sulfate, tribasic lead sulfate, basic lead sulfite, dibasic lead phosphite, coprecipitated lead silicate and silica gel, dibasic lead phthalate, tribasic lead maleate, lead salicylate, lead stearate, basic lead stearate, dibasic lead stearate, lead laurate, lead octylate, lead 12-hydroxystearate, lead behenate and lead naphthenate.

Examples of the above-mentioned zinc, calcium, magnesium and barium stabilizers include inorganic compounds such as oxides, hydroxides, carbonates, basic carbonates, (meta)borates, (meta)silicates, phosphates, phosphites, basic phosphates, aluminates, titanares and rhodanates of these metals and metal soaps of these metals with organic carboxylic acids. Examples of the organic carboxylic acids include acetic acid, lactic acid, stearyllactic acid, caproic acid, pelargonic acid, lauric acid, 2-ethylhexylic acid, myristic acid, palmitic acid, undecylenic acid, ricinoleic acid, linoleic acid, linolenic acid, neodecanoic acid, oleic acid, stearic acid, isodecanoic acid, isostearic acid, 12-hydroxystearic acid, 12-ketostearic acid, chlorostearic acid, phenylstearic acid, arachic acid, behenic acid, erucic acid, brassidic acid and similar acids, natural materials comprising mixtures of these acids (for example, tallow fatty acids, coconut oil fatty acids, tung oil fatty acids, soybean oil fatty acids and cotton seed oil fatty acids), benzoic acid, chlorobenzoic acid, toluic acid, salicylic acid, p-tert-butylbenzoic acid, 5-tert-octylsalicylic acid, naphthenic acid, xylic acid, ethylbenzoic acid, isopropylbenzoic acid, di-tert-butylbenzoic acid, bromobenzoic acid, maleic acid, adipic acid, phthalic acid, monobutyl maleate, monodecyl phthalate and cyclohexanedicarboxylic acid.

Examples of the above-mentioned organotin stabilizers include methylstannoic acid, butylstannoic acid, octylstannoic acid, dimethyltin oxide, dibutyltin oxide, dioctyltin oxide, dimethyltin sulfide, dibutyltin sulfide, dioctyltin sulfide, dicyclohexyltin sulfide, monobutyltin oxide sulfide, methylthiostannoic acid, butylthiostannoic acid, octylthiostannoic acid, dibutyltin laurate, dibutyltin stearate, dioctyltin dioleate, dibutyltin basic laurate, dibutyltin dicrotonate, dibutyltin bis(butoxydiethylene glycol maleate), dibutyltin methyl octyl neopentyl glycol maleate, dibutyltin isooctyl 1,4-butanediol maleate, dibutyltin dimethacrylate, dibutyltin dicinnamate, dioctyltin bis(oleylmaleate), dibutyltin bis(stearylmaleate), dibutyltin itaconate, dioctyltin maleate, diamyltin bis(cyclohexylmaleate), dimethyltin dicrotonate, diethyltin bis(isooctylcitraconate), dipropyltin bis(benzylmaleate), diisobutyltin bis(propylmaleate), dicyclohexyltin maleate, dioctyltin bis(butylmaleate), dibutyltin dimethoxide, dibutyltin dilauroxide, dioctyltin ethylene glycoxide, pentaerythritol/dibutyltin oxide condensate, dibutyltin bis(laurylmercaptide), dimethyltin bis(stearylmercaptide), monobutyltin tris (laurylmercaptide), dibutyltin β-mercaptopropionate, dioctyltin β-mercaptopropionate, dibutyltin mercaptoacetate, monobutyltin tris(isooctylmercaptoacetate), monooctyltin tris(2-ethylhexylmercaptoacetate), dibutyltin bis(isooctylmercaptoacetate), dioctyltin bis(isooctylmercaptoacetate), dioctyltin bis(2 -ethylhexylmercaptoacetate), dimethyltin bis(isooctylmercaptopropionate), monobutyltin tris(isooctylmercaptopropionate), bis[monobutyl di(isooctoxycarbonylmethylenethio)tin] sulfide, bis[dibutylmono(isooctoxycarbonylmethylenethio)tin] sulfide, monobutylmonochlorotin bis(isooctylmercaptopropionate), monobutylmonochlorotin bis(isooctylmercaptoacetate) monobutylmonochlorotin bis(laurylmercaptide), butyltin his (ethylcellosolvemaleate), bis(dioctyltinbutylmaleate)maleate, bis(methyltin diisooctylethyl glycolate) disulfide, bis(-methyl/dimethyltinmono/diisooctyl thioglycolate) trisulfide, bis(methyltin diisooctyl thioglycolate) trisulfide, bis(butyltin diisooctyl thioglycolate) trisulfide and 2-ethoxycarbonylethyltin tris(butyl thioglycolate).

These metallic stabilizers may be preferably used at a ratio of 0.01 to 10 parts by weight, in particular, 0.05 to 5 parts by weight per 100 parts by weight of the chlorinated resin.

The composition of the present invention may further comprise an organic phosphite antioxidant. Examples thereof include diphenyl decyl phosphate, triphenyl phosphite, trisnonylphenyl phosphite, tridecyl phosphite, tris(2-ethylhexyl) phosphite, tributyl phosphite, dilauryl acid phosphite, dibutyl acid phosphite, tris (dinonylphenyl) phosphite, trilauryl trithiophosphite, trilauryl phosphite, bis(neopentyl glycol)-1,4-cyclohexanedimethyl diphosphite, distearyl pentaerythritol diphosphite, diisodcyl pentaerythritol diphosphite, diphenyl acid phosphite, tris(lauryl-2-thioethyl) phosphite, tetratridecyl-1,1,3-tris(2'-methyl-5'-tert-butyl-4'-oxyphenyl)butane diphosphite, tetra(C$_{12\sim15}$ mixed alkyl)-4, 4'-isopropylidene diphenyl diphosphite, tris(4-oxy-2,5-di-tert-butylphenyl) phosphite, tris(4-oxy-3,5-di-tert-butylphenyl) phosphite, 2-ethylhexyl diphenyl phosphite, tris(mono, di-mixed methylphenyl) phosphite, hydrogenated 4,4'-isopropylidenediphenol polyphosphite, diphenyl bis[4,4'-n-butylidenebis (2-tert-butyl-5-methylphenol)]thiodiethanol diphosphite, bis(octylphenyl) bis[4,4-n-butylidenebis (2-tert-butyl-5-methylphenol )]-1,6-hexanediol diphosphite, phenyl-4,4'-isopropylidenediphenol pentaerythritol diphosphite, phenyl disodecyl phosphite, tetratridecyl-4,4'-n-butylidenebis(2-tert-butyl-5-methylphenol) diphosphite and tris(2,4-di-tert-butylphenyl) phosphite.

The composition of the present invention may further comprise a photo-stabilizer such as an UV absorber or a hindered amine compound to thereby further improve the light resistance thereof.

Examples of the photostabilizer include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3',5'-dicumylphenyl)benzotriazole and 2,2'-methylenebis(4-tert-octyl-6-benzotriazolyl)-phenol; benzoates such as phenyl salicylate, resorcinol monobenzoate, 2,4-di-tert-butylphenyl 3',5'-di-tert-butyl-4'-hydroxybenzoate and hexadecyl 3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl α-cyano-β,β-diphenylacrylate and methyl 2-cyano-3-methyl-3-(p-methoxyphenyl)acrylate; and hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(1,2,2,6,6-pentamethyl-4-piperidyl) di(tridecyl) 1,3,4,4-butanetetracarboxylate, bis(1,2,2,6,5-pentamethyl-4-piperidyl) 2-butyl-2-(2,5-di-tert-butyl-4-hydroxybenzyl)malonate, 1-(2-hydroxyethyl)2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino) hexane/2,4-dichloro-6-tert-octylamino-s-triazine polycondensate and 1,6-bis(2,2,6,6-tetramethyl-4-piperidylamino) hexane/2,4-dichloro-6-morpholino-s-triazine polycondensate.

The composition of the present invention may furhter comprise β-amino-crotonates such as 1,4-butanediol bis(β-aminocrotonate) and thiodiglycol bis(β-aminocrotonate); urea compounds such as diphenethylurea and diphenylthiourea; indoles such as α-phenylindole and α-(octylphenyl)indole; dihydropyridines such as 2,6-dimethyl-3,5-dicarbooctoxy-1,4-dihydropyridine and 2,6-dimethyl-3,5-dicarbolauryloxy-1,4-dihydropyridine; β-diketone compounds such as dibenzoylmethane, benzoylacetone, stearoylbenzoylmethane, caproylbenzoylmethane and dehydroacetic acid; polyhydric alcohols such as trimethylolpropane, glycerol, tris(hydroxyethyl) isocyanurate, pentaerythritol, dipentaerythritol, mannitol, sorbitol, pentaerythritol stearate, dipentaerythritol adipate and dipentaerythritol pyrrolidonecarboxylate; organic sulfur compounds such as dilauryl thiodipropionate, distearyl thiodipropionate and pentaerythritol tetra(laurylmercaptopropionate); phenols such as hisphenol A, 2,6-di-tert-butyl-p-cresol and stearyl 3,5-ditert-butyl-4-hydroxyphenylpropionate; and melamines.

In addition, the composition of the present invention may contain, for example, crosslinking agent, pigment, filler, foaming agent, antistatic agent, antifogging agent, plate-out inhibitor, surface treatment, lubricant, flame-retardant, fluorescent agent, mildewproofing agent, bactericide, sequestering agent, light deterioration inhibitor, processing aid, mold releasing agent and reinforcing agent, if required.

EXAMPLES

To further illustrate the effect of the chlorinated resin composition of the present invention comprising the stabilizer of the present invention, and not by way of limitation, the following Examples will be given.

EXAMPLE 1

The following composition was kneaded at 190° C. for five minutes and the pressed at 170° C. under 200 kg/cm$^2$ for five minutes to thereby give a sample of 1 mm in thickness. This sample was placed in an oven at 190° C. and the time required for blackening the sample was measured to thereby examine the heat stability thereof.

Further, an outdoor exposure test was performed to measure the time required for whitening (chalking).

Table 1 shows the results.

| (Composition) | |
|---|---|
| PVC (P = 1050) | 100 parts by weight |
| tribasic lead sulfate | 0.5 |
| lead stearate | 1.5 |
| dibasic lead stearate | 0.3 |
| calcium stearate | 0.3 |
| calcium carbonate | 2.0 |
| titanium oxide | 0.2 |
| carbon black | 0.01 |
| cupric chloride | 0.1 |
| hydrotalcite (Table 1) | 0.5 |

TABLE 1

| No. | Hydrotalcite | Heat stability | Outdoor exposure |
|---|---|---|---|
| Comparative | | | |
| 1-1 | no | 30 (min) | 7 (month) |
| 1-2 | calcium stearate | 45 | 10 |
| Example | | | |
| 1-1 | DHT-4A | 90 | 16 |
| 1-2 | Alcamizer I | 75 | 15 |
| 1-3 | Alcamizer II | 75 | 15 |
| 1-4 | Alcamizer IV | 90 | 16 |
| 1-5 | stabilizer III (no cupric chloride) | 105 | 18 |
| 1-6 | stabilizer IV (no cupric chloride) | 105 | 17 |

EXAMPLE 2

A sample was produced from the following composition in the same manner as the one described in Example 1. By using the obtained sample, a heat stability test at 190° C. and an initial coloration test were performed. Further, the Izod impact strength (kg·cm/cm$^2$) thereof was determined after irradiating with a weatherometer for 168 hours and the elongation was determined after irradiating for 504 hours.

Table 2 shows the results wherein the elongation was expressed in the ratio to the original length, i.e., the retention of elongation.

| (Composition) | |
|---|---|
| PVC (P = 1050) | 100 parts by weight |
| acrylic rubber modifier (Kaneace FM) | 10 |
| stearic acid | 0.5 |
| tribasic lead sulfate | 0.5 |
| dibasic lead stearate | 0.5 |
| distearyl pentaerythritol diphosphite | 0.3 |
| DHT-4A | 0.5 |
| inorganic copper compound (Table 2) | 0.1 |

TABLE 2

| No. | Inorganic copper compound | Amount | Heat stability (min) | Initial coloration | Izod impact strength | Retention of elongation (%) |
|---|---|---|---|---|---|---|
| Comp. | | | | | | |
| 2-1 | none | | 30 | 8 | 7 | 23 |
| Example | | | | | | |
| 2-1 | cupric chloride | 0.1 | 90 | 3 | 19 | 66 |
| 2-2 | cupric chloride | 0.15 | 75 | 2 | 21 | 71 |
| 2-3 | copper hydroxide | 0.1 | 90 | 3 | 16 | 70 |
| 2-4 | copper hydroxide | 0.15 | 75 | 3 | 18 | 73 |
| 2-5 | basic copper carbonate | 0.1 | 120 | 2 | 18 | 71 |
| 2-6 | basic copper carbonate | 0.15 | 90 | 2 | 21 | 74 |

*: Initial coloration is evaluated in ten grades [1 (good)⟵⟶10 (poor)].

EXAMPLE 3

By using the following composition, a sheet of 1 mm in thickness was produced. This sheet was subjected to outdoor exposure for one year and then the extent of chalking was evaluated. Table 3 shows the results wherein the extent of chalking was evaluated in ten grades [1 (no change)⟵⟶10 (serious chalking)].

| (Composition) | |
|---|---|
| PVC (P = 800) | 100 parts by weight |
| calcium stearate | 0.6 |
| zinc stearate | 1.2 |
| dibutyltin dilaurate | 0.3 |
| 2-(2'-hydroxy-5'-methylphenyl)benzotriazole | 0.2 |
| cupric chloride | 0.1 |
| hydrotalcite (Table 3) | 0.5 |

TABLE 3

| No. | Hydrotalcite | Chalking |
|---|---|---|
| Comp. | | |
| 3-1 | none | 8 |
| 3-2 | calcium stearate | 7 |
| Example | | |
| 3-1 | DHT-4A | 2 |
| 3-2 | Alcamizer I | 3 |
| 3-3 | Alcamizer II | 3 |
| 3-4 | Alcamizer IV | 2 |
| 3-5 | stabilizer I (no cupric chloride) | 2 |
| 3-6 | stabilizer II (no cupric chloride) | 2 |
| 3-7 | stabilizer III (no cupric chloride) | 2 |
| 3-8 | stabilizer IV (no cupric chloride) | 1 |

What is claimed is:

1. A stabilizer for a rigid polyvinyl chloride resin comprising a reaction product obtained from a water-soluble inorganic copper compound and a hydrotalcite compound represented by the following general formula (I) at a ratio of from 0.01 to 2 parts by weight of the water-soluble inorganic copper compound per part by weight of the hydrotalcite compound;

$$Mg_{1-x}Al_x(OH)_2A_{x/2} \cdot mH_2O \qquad (I)$$

wherein x is a real number falling within a range of $0 < X \leq 0.5$; A represents a $CO_3$ or $SO_4$ group; and m is a real number, wherein said inorganic copper compound is adsorbed into the hydrotalcite.

2. A stabilizer for a polyvinyl chloride resin as claimed in claim 1, wherein said inorganic copper compound is a copper halide.

3. A stabilized rigid polyvinyl chloride resin composition prepared by adding a stabilizer to a polyvinyl chloride resin, said stabilizer comprising a reaction product obtained from a water-soluble inorganic copper compound and a hydrotalcite compound represented by the following general formula (I) at a ratio of from 0.01 to 2 parts by weight of the water-soluble inorganic copper compound per part by weight of the hydrotalcite compound:

$$Mg_{1-x}Al_x(OH)_2A_{x/2} \cdot mH_2O \qquad (I)$$

wherein x is a real number falling within a range of $0 < X \leq 0.5$; A represents a $CO_3$ or $SO_4$ group; and m is a real number, wherein said inorganic copper compound is adsorbed into the hydrotalcite.

4. A polyvinyl chloride resin composition as claimed in claim 3, obtained by adding 0.02 to 5 parts by weight of said stabilizer to 100 parts by weight of said polyvinyl chloride resin.

* * * * *